United States Patent Office 3,161,617
Patented Dec. 15, 1964

3,161,617
POLYMERIZATION OF FORMALDEHYDE
Helmuth Kritzler, Cologne-Flittard, and Kuno Wagner, Leverkusen, Germany, assignors to Farbenfabriken Bayer Aktiengesellschaft, Leverkusen, Germany, a corporation of Germany
No Drawing. Filed Apr. 15, 1960, Ser. No. 22,402
Claims priority, application Germany Apr. 29, 1959
10 Claims. (Cl. 260—67)

The present invention relates to the production of high molecular weight film-forming polyoxymethylenes by polymerization of formaldehyde, and more especially to the activation of said polymerization by methylol derivatives of organic nitrogen compounds.

It is known that formaldehyde can be polymerized in the presence of suitable catalysts, such as for example tertiary and quaternary nitrogen bases, and also organometallic compounds and metal alcoholates, to form polyoxymethylenes of high molecular weight.

It has now been found that N-methylol-, N-methylolether- and N-methylolthioether derivatives of organic nitrogen compounds are excellent catalysts for the polymerization of formaldehyde to polyoxymethylenes of high molecular weight. High-grade thermoplastic polyoxymethylenes are thereby obtained. Suitable catalysts are more especially those compounds which contain at least one

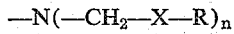

$$-N(-CH_2-X-R)_n$$

group in the molecule. In this formula, X represents an oxygen or sulphur atom and R represents a hydrogen atom or an organic radical, more especially an aliphatic cycloaliphatic, araliphatic or aromatic radical, X representing only oxygen in case that R stands for hydrogen, and $n$ stands for 1 or 2, preferably 1.

As parent substances for the production of the aforementioned catalysts, i.e. organic nitrogen compounds having at least one hydrogen atom on the nitrogen atom and which are capable of forming methylol derivatives, there may be mentioned:

Carboxylic acid amides of saturated or unsaturated aliphatic, cycloaliphatic, araliphatic and aromatic mono- or polycarboxylic acids with up to 25 carbon atoms as well as the analogous thiocarboxylic acid amides,
Carboxylic acid imides of saturated or unsaturated aliphatic, cycloaliphatic, araliphatic and aromatic monocarboxylic acids, furthermore saturated or unsaturated cyclic carboxylic acid imides of the series of aliphatic, cycloaliphatic, araliphatic and aromatic dicarboxylic acids with up to 25 carbon atoms,
Lactams with a 5 to 7 membered ring-system,
Urethanes which have an aliphatic, cycloaliphatic or araliphatic radical at the oxygen and, the amino group of which may be substituted by an aliphatic, cycloaliphatic and araliphatic radical, as well as polyurethanes and the sulphur analogues of mono- and polyurethanes,
Ureas and thioureas as well as their mono-, di- and tri-substitution products with saturated or unsaturated aliphatic, cycloaliphatic and araliphatic radicals with a total of up to 40 carbon atoms, furthermore ureas and thioureas which can only be substituted at one of the two nitrogen atoms by one or two aromatic radicals, moreover acyl ureas which may have one or two saturated or unsaturated aliphatic, cycloaliphatic or araliphatic radicals,
Urones and thiourones which may be substituted at one nitrogen atom by an aliphatic, cycloaliphatic or araliphatic radical having up to 12 carbon toms,
Acetylene ureas produced from 2 mols of urea and 1 mol of glyoxal or diacetyl respectively as well as their sulphur analogues,
Cyclic ureas as ethylene urea, propylene urea, and benzimidazolone,
Hydrazocarbonamide as well as 1,6-mono-, di-, tri-, and tetra-substitution products. The substituents may consist of saturated or unsaturated aliphatic, cycloaliphatic or araliphatic radicals, and may contain in total up to 40 carbon atoms, furthermore hydrazodicarbonamides the N-atoms of which may be members of a heterocyclic ring in 1,6-position as well as the sulphur analogues of the aforementioned hydrazodicarbonamides,
Hydrazodicarboxylic acid esters the substituents of which may be saturated or unsaturated aliphatic, cycloaliphatic or araliphatic radicals with up to 20 carbon atoms each,
Hydrazides of aliphatic, cycloaliphatic, araliphatic and aromatic mono- or polycarboxylic acids which at the nitrogen atom may be substituted in 1-position by a saturated or unsaturated aliphatic, cycloaliphatic or araliphatic radical with up to 20 carbon atoms,
Hydrazo-mono-carboxylic acid esters which may carry at the oxygen atom a saturated or unsaturated aliphatic, cycloaliphatic, araliphatic radical which may contain up to 18 carbon atoms, and which are substituted at the nitrogen atom in 1-position by a saturated or unsaturated aliphatic, cycloaliphatic or araliphatic radical with up to 20 carbon atoms,
Semi-carbazide and thiosemicarbazide as well as their mono-, di- or tri-substitution products in 1,4-position with saturated or unsaturated aliphatic, cycloaliphatic or araliphatic radicals with up to 40 carbon atoms altogether, moreover semi-carbazides and thiosemicarbazides which may either be mono- or di-substituted in 1- or 4-position with aromatic radicals,
Semi-carbazide monocarboxylic acid esters and their sulphur analogues which carry at the oxygen atom a saturated or unsaturated aliphatic, cycloaliphatic or araliphatic radical which contains up to 20 carbon atoms, and which may be substituted at the nitrogen atom in 1-position by one or two saturated or unsaturated aliphatic, cycloaliphatic or araliphatic radical with up to 20 carbon atoms altogether,
Allophanic acid esters and their mono- or 1,1,- or 1,3-disubstitutions products respectively with saturated or unsaturated aliphatic, cycloaliphatic or araliphatic radicals with up to 25 carbon atoms altogether, which at the oxygen atom carry a saturated or unsaturated aliphatic, cycloaliphatic or araliphatic radical with up to 20 carbon atoms,
Biuret and its 1-mono- and 1,5-disubstitution products with saturated and unsaturated aliphatic, cycloaliphatic and araliphatic radicals having up to 40 carbon atoms altogether,
Guanidine and guanidines, the imino-nitrogen of which may be unsubstituted, or araliphatically, cycloaliphatically, araliphatically or aromatically substituted, the amino groups of which may be monosubstituted or symmetrically or asymmetrically disubstituted, preferably by way of aliphatic, cycloaliphatic and araliphatic radicals having up to 45 carbon atoms altogether,
Aminoguanidine,
Melamine and such substitution products which may be mono-, di-, tri- and tetra-substituted at the amino groups in 2-, 4-, 6-position with saturated or unsaturated aliphatic, cycloaliphatic or araliphatic radicals having up to 60 carbon atoms altogether, furthermore such melamines one or two amino groups of which may be part of a teterocyclic ring,
Carbazole,
Dicyandiamide,
Dicyandiamidine.

Specific examples of the catalysts according to the invention are:

Formamide-N-methylolmethyl ether,
Acetamide-N-methylolmethyl ether,
Acetamide-N-methylolbutyl ether,
Thioacetamide-N-methylolmethyl ether,
N-methylolphthalimide,
N-methylolsuccinimide,
ε-caprolactam-N-methylolmethyl ether,
Pyrrolidone-N-methylolmethyl ether,
Carbamic acid ethyl ester-N-methylolmethyl ether,
Tetramethylenediethylurethane-N,N'-dimethyloldiethyl ether,
N-butyl carbamic acid thiobutyl ester-N-methylolmethyl ether,
N,N'-dimethylolurea-dimethyl ether,
N,N'-dimethylolthiourea-diethyl ether,
N,N'-dimethylolthiourea-dipropyl ether,
N,N'-dimethylolurea-dibutyl ether,
N,N'-dimethylolurea-dipropylthioether,
N,N'-dimethylolthiourea-didodecylthioether,
N-methylolbutyl ether-N'-acetylurea,
N,N'-dimethylolurone-dimethyl ether,
N,N'-dimethylolurone-diethylthioether,
Dimethylolacetyleneurea-dibutyl ether,
Dimethylacetyleneurea-dimethyloldipropyl ether,
Benzimidazolone, 1,3-dimethyloldibutyl ether,
Tetramethylolhydrazodicarbonamide-tetrabutyl ether,
1,6-diethylhydrazodicarbonamide-dimethylolbutyl ether,
Tetramethyloldithiohydrazodicarbonamide-tetrabutyl ether,
Hydrazodicarboxylic acid dibutyl ester- monomethylolbutyl ether,
Hydrazodicarboxylic acid diallyl ester-monomethyloliso-propyl ether,
Propionic acid hydrazide-dimethyloldiethyl ether,
Adipic acid dihydrazide-tetramethylol tetrabutyl ether,
Hydrazine carboxylic acid ethyl ester-dimethyloldibutyl ether,
1-butylhydrazine carboxylic acid ethyl ester-monomethylol isopropyl ether,
4-dibutylsemicarbazide-dimethyloldiethyl ether,
4-dodecylthiosemicarbazide-dimethyloldioctyl ether,
1-stearylsemicarbazide carboxylic acid ethyl ester-monomethylol ethyl ether,
1-dodecylthiosemicarbazide carboxylic acid ethyl ester-monomethylolbutyl ether,
Allophanic acid ethyl ester-dimethyloldibutyl ether,
1-phenylallophanic acid ethyl ester-monomethylolbutyl ether,
Tetramethylolbiuret-tetrabutyl ether,
1,5-dibutylbiuret-monomethylol ethyl ether,
Trimethylolguanidine-trimethyloltributyl ether,
N-phenylguanidine-trimethylol tributyl ether,
N-butylguanidine-dimethyloldidodecyl ether,
Tetramethylolaminoguanidine-tetrabutyl ether,
Melamine-hexanemethylolmethyl ether,
Melamine-trimethyloltributyl ether,
2,4,6-triethylamino-1,3,5-triazine-dimethyloldioctyl ether,
2,4-diamino-6-piperidino-1,3,5-triazine-dimethylol diisopropyl ether,
Carbazole-N-methylolbutyl ether,
Dicyandiamide-dimethyloldibutyl ether,
Dicyandiamidine-trimethyloltridodecyl ether.

Another group of catalysts according to the invention are condensation and mixed condensation products of low or high molecular weight and which are obtained from the aforementioned organic nitrogen compounds capable of forming methylol derivatives and which have at least one hydrogen atom on the nitrogen atom by reacting the organic nitrogen compounds either with formaldehyde alone or with a mixture of formaldehyde and one or more other aldehydes or ketones, such as for example acetaldehyde, butyraldehyde, enanth-aldehyde, benzaldehyde, acetone, acetophenone and the like. These mixed condensation products may be employed as catalysts in the process according to the present invention as well as their functional derivatives, such as for example their ethers or thioethers. These condensates or mixed condensates respectively are produced according to known methods as they are used for the production of urea-formaldehyde-resins, melamine-formaldehyde-resins, acid amide-formaldehyde-resins, dicyandiamide-formaldehyde-resins. Resins containing N-methylol groups may be etherified partially or completely with aliphatic and cycloaliphatic alcohols or mercaptans respectively.

There are preferably used formaldehyde mixed condensates of urea and thiourea respectively, or melamine or dicyandiamide with hydrazodicarbonamides, hydrazocarboxylic acid esters, semicarbazides, semicarbazide carboxylic acid esters, cyclic ureas as for example ethyleneurea, furthermore hydrazides, biuret derivatives, urone-derivatives and allophanic acid esters.

For carrying out the polymerization process according to the present invention, it is necessary to carry out the entire reaction under substantially anhydrous conditions. For this purpose, it is necessary to prepare monomeric formaldehyde having a water content of less than 0.5 percent, and preferably less than 0.1 percent. In order to prepare monomeric formaldehyde having a water content of less than 0.5 percent, it is preferred to subject paraformaldehyde, α-polyoxymethylene or trioxane to thermal decomposition and to mix the monomeric formaldehyde in the pyrolysis vessel with a pure, anhydrous, inert carrier gas, such as nitrogen. Thereafter, the formaldehyde is conducted through an extensive cooling system at a temperature of −20° C. In the cooling system, water is frozen out or residues of water are removed by initial polymerization of a part of the formaldehyde. The formaldehyde can then be supplied to the polymerization vessel in gaseous or liquid form. The flow velocity at which the formaldehyde is supplied to the polymerization vessel may be varied and depends firstly on the pyrolysis speed and secondly on the temperature in the polymerization vessel.

As reaction medium, it is possible with advantage to use ethers, aliphatic, cycloaliphatic, araliphatic, and aromatic hydrocarbons and also halogenated aliphatic, cycloaliphatic araliphatic and aromatic hydrocarbons. The quantity of solvent employed may be varied within wide limits. It is, however, preferable to employ from 3 to 100 parts by volume of solvent per part by weight of formaldehyde. The polymerization can be carried out at a temperature of from −120° C. to +100° C., but it has proved advantageous to work at temperatures between −90° C. and +70° C.

Mixtures of two or more of the aforementioned catalysts may be employed in the process according to the present invention. Although the catalysts according to the invention may be introduced in undissolved form into the reaction medium, it is frequently preferred to introduce the catalyst into the reaction medium in the form of a solution in an inert organic solvent. The catalyst is usually dissolved in the same solvent as that in which polymerization is to take place.

The quantity of catalyst employed may be varied within wide limits. The use of more than 0.2 mol of catalyst per 1000 parts by volume of solvent and less than 0.000001 mol of catalyst per 1000 parts by volume of solvent is in most cases not necessary. It is preferable to employ the catalyst in an amount of from 0.1 is 0.00001 mol per 1000 parts by volume of solvent, since the best results are produced in this concentration range.

After completion of the polymerization, the reaction product is separated from the solvent by filtration or centrifuging. The process may with advantage also be carried out continuously or semi-continuously; fresh catalyst can be added to the reaction medium at the rate at which the high polymer is separated out. The products obtained by the process according to the present invention can be stabilized by the known procedure of acylation or etherification, as described for example in U.S. patent applications Serial Nos. 1,856 and 854,573.

One essential advantage arising from the use of the catalysts according to the invention in the polymerisation of formaldehyde is that the high-molecular weight polyoxymethylenes prepared in this way show a considerably more uniform molecular weight distribution than polyoxymethylenes which have been prepared with known tertiary amine catalysts, such as for example trimethylamine. According to the present process, polyoxymethylenes of high molecular weight are obtained which contain practically no fractions having viscosity values below 0.4. Thus, the mechanical properties, for example strength and toughness, of the polyoxymethylenes and their derivatives, such as their acylation and etherification derivatives are essentially improved.

The polyoxymethylene produced by the process of the present invention and which have been stabilised in accordance with the aforementioned processes can be worked up into high-grade plastics either with or without the addition of such substances as for example pigments, fillers, plasticisers, stabilisers and the like.

In carrying through the process of the present invention there may be used as inert solvents for instance: cyclic and acylic ethers such as dimethyl ether, diethyl ether, dipropyl ether, dibutyl ether, dioxan, tetrahydrofuran, esters, especially esters of saturated alcohols with saturated carboxylic acids, such as propylacetate, butylacetate, preferably aliphatic, cycloaliphatic aromatic hydrocarbons such as butane, hexane, heptane, cyclohexane, benzene, toluene, xylene, furthermore halogenated, especially chlorinated hydrocarbons, such as methylenedichloride, chloroform, carbontetrachloride, ethylenedichloride, chlorobenzene, dichlorobenzene.

Example 1

Monomeric formaldehyde is produced by the thermal decomposition of paraformaldehyde. The monomeric formaldehyde is mixed in the pyrolysis vessel with pure, dry nitrogen and thereafter conducted through an extensive cooling system at a temperature of —20° C. The formaldehyde is liquefied in a second cooling system at —85° C., and supplied to the polymerisation vessel, which is provided with a formaldehyde supply pipe, a mechanical stirrer and a gas outlet pipe. 0.0708 part by weight of N-methylol phthalimide dissolved in 1000 parts by volume of anhydrous toluene has previously been introduced into the reaction vessel. The formaldehyde is introduced dropwise into the reaction medium over a period of 2½ hours and while stirring and cooling to —20° C., whereby polymerisation occurs. After stirring for another half an hour at —20° C., the polymerisation product is filtered on a suction filter and freed from adhering solvent by expressing. A pure white polyoxymethylene of high molecular weight is obtained, which is extracted by stirring twice with methanol and twice with acetone. The product is thereafter dried for 4 hours at 60° C. in vacuo. The yield is 100 g., this being 97% calculated on the formaldehyde (103 g.) introduced into the polymerisation vessel. The intrinsic viscosity of the formaldehyde polymer, measured in butyrolactone at 150° C., is 1.1.

Example 2

The procedure is analogous to that of Example 1. Liquid monomeric formaldehyde is introduced dropwise over a period of 2½ hours into a solution of 0.0351 part by weight of N-methylol succinimide in 1000 parts by volume of anhydrous toluene. The product is worked up as described in Example 1. 115 g. of pure white polyoxymethylene are obtained, this corresponding to a yield of 97.5%, calculated on the amount of formaldehyde (118 g.) introduced into the polymerisation vessel. The intrinsic viscosity of the polymer is 0.69 (measured in butyrolactone at 150° C.).

Example 3

Monomeric formaldehyde is prepared by the thermal decomposition of α-polyoxymethylene and mixed in the pyrolysis vessel with pure, dry nitrogen as carrier gas. The formaldehyde is thereafter conducted through an extensive cooling system at a temperature of —20° C. and supplied in the form of gas to the polymerisation vessel. In the polymerisation vessel are 0.0592 part by weight of N,N'-dimethylol urea dimethyl ether, dissolved in 1300 parts by volume of anhydrous toluene. The monomeric gaseous formaldehyde is introduced into the polymerisation vessel over a period of 2½ hours while stirring and cooling to —20° C. An opaque suspension of high-molecular weight polyoxymethylene is formed. After completion of the reaction, the product is worked up as described in Example 1. 134 g. of pure white polyoxymethylene are isolated. The yield is 92.5% of the formaldehyde (145 g.) introduced into the polymerisation vessel. The polyoxymethylene thus obtained has an intrinsic viscosity of 1.05 (measured in butyrolactone at 150° C.).

Example 4

The procedure is as described in Example 3. A solution of 0.0628 part by weight of ε-caprolactam-N-methylol methyl ether in 4 parts by volume of anhydrous toluene is added to 1000 parts by volume of anhydrous toluene. Monomeric anhydrous gaseous formaldehyde is introduced into the reaction medium while stirring and cooling to —20° C. Polymerisation is complete after 2½ hours. After working up as described in Example 1, there are obtained 128 parts of pure white polyoxymethylene. The yield corresponds to 90%, based on the formaldehyde (142 g.) introduced into the reaction vessel. The intrinsic viscosity of the product is 0.71 (measured in butyrolactone at 150° C.).

Example 5

A solution of 0.133 part by weight of the N-methylol methyl either of the ethyl carbamate in 10 parts by volume of anhydrous toluene is added to 1300 parts by volume of anhydrous toluene. Monomeric anhydrous gaseous formaldehyde is introduced into the reaction medium while stirring and cooling to —20° C. as described in Example 3. Polymerisation is complete after 2½ hours. The product is worked up as described in Example 1. 115 g. of pure white polyoxymethylene are isolated. The yield is 93.5%, based on the formaldehyde (123 g.) introduced into the polmerisation vessel. The intrinsic viscosity of the high polymer is 0.78 (measured in butyrolactone at 150° C.).

Example 6

Monomeric anhydrous formaldehyde which has been prepared by the pyrolysis of paraformaldehyde as described in Example 3 is introduced while stirring and cooling to —20° C. into a solution of 0.0515 part by weight of acetamide N-methylol methyl ether in 1300 parts by volume of anhydrous toluene. Polymerisation is complete after 3 hours. The product is worked up as described in Example 1. 156 g. of pure white polyoxymethylene are obtained. The yield corresponds to 91.2%, based on the formaldehyde (171 g.) introduced into the polymerisation vessel. The intrinsic viscosity of the product, measured in butyrolactone at 150° C., is 0.95.

Example 7

Monomeric anhydrous formaldehyde is prepared as described in Example 3 by the pyrolysis of paraformaldehyde. 0.0704 part by weight of N,N'-dimethylol thiourea diethyl ether is added to 130 parts by volume of anhydrous toluene. The formaldehyde is introduced into the polymerisation vessel while stirring and cooling to —20° C. Polymerisation is complete after 2½ hours. The product is worked up as described in Example 1. The yield is 109 g., corresponding to 90%, based on the formaldehyde (121 g.) introduced into the reaction vessel. The polymer product has an intrinsic viscosity of 1.2 (measured in butyrolactone at 150° C.).

*Example 8*

The procedure is as described in Example 3. 0.200 part by weight of N,N'-dimethylol thiourea didodecyl thioether is introduced into 1300 parts by volume of anhydrous toluene. The anhydrous monomeric formaldehyde is introduced into the reaction medium over a period of 2½ hours and while stirring and cooling to —20° C. The product is worked up as described in Example 1. 96 g. of pure white polyoxymethylene are isolated, this corresponding to a yield of 88%, based on the formaldehyde (109 g.) introduced into the reaction vessel. The intrinsic viscosity of the product is 1.4 (measured in butyrolactone at 150° C.).

*Example 9*

Gaseous monomeric formaldehyde is prepared as described in Example 3. 1000 parts by volume of anhydrous toluene, to which has been added 0.0918 part of weight of melamine hexamethylol methyl ether dissolved in 30 parts by volume of anhydrous toluene are employed as reaction medium. The formaldehyde is introduced into the reaction medium which is cooled to —20° C. over a period of 2 hours. The product is worked up as described in Example 1. 95 g. of pure white polyoxymethylene are obtained, corresponding to a yield of 92.3% based on the formaldehyde (=103 g.) introduced into the reaction vessel. The intrinsic viscosity of the polymer is 0.65 (measured in butyrolactone at 150° C.).

*Example 10*

Monomeric, gaseous formaldehyde is prepared by the pyrolysis of paraformaldehyde as described in Example 3. 0.100 part by weight of a condensation product of 1 mol of dicyandiamide and 2 mols of formaldehyde, the methylol groups of which have been etherified with butanol, and dissolved in 1300 parts by volume of anhydrous toluene are introduced into the polymerisation vessel. Formaldehyde is introduced into the polymerisation vessel over a period of 2½ to 3 hours and while stirring and cooling to —20° C. The product is worked up as described in Example 1. The dried pure white polyoxymethylene weighs 144 g., this being 90.5% of the formaldehyde (159 g.) introduced into the polymerisation vessel. The intrinsic viscosity of the polymerisation product is 1.01 (measured in butyrolactone at 150° C.).

*Example 11*

Monomeric anhydrous formaldehyde is prepared as described in Example 3 by the pyrolysis of paraformaldehyde. 0.100 part by weight of a condensation product of 1 mol of guanidine and 2 mols of formaldehyde, the methylol groups of which have been etherified with butanol is employed as catalyst. The catalyst is dissolved in 1300 parts by volume of anhydrous toluene. The anhydrous gaseous formaldehyde is introduced into the polymerisation vessel while stirring and cooling to —20° C. Polymerisation is complete after 2½ hours. The product is worked up as described in Example 1. 107 g. of pure white polyoxymethylene are obtained, this corresponding to a yield of 93% based on the formaldehyde (115 g.) introduced into the polymerisation vessel. The intrinsic viscosity of the polymer is 1.10 (measured in butyrolactone at 150° C.).

*Example 12*

In a manner analogous to that of Example 3, 0.100 part by weight of a condensation product of 1 mol of dicyandiamide, 1.5 mols of formaldehyde and 0.5 mol of acetaldehyde, the methylol and alkylol groups of which have been etherified with butanol, is dissolved in 1300 parts by volume of anhydrous toluene. Anhydrous gaseous formaldehyde is introduced into the polymerisation vessel over a period of 2 hours and while stirring and cooling to —20° C. The product is worked up as described in Example 1. 121 g. of pure white polyoxymethylene are obtained. This corresponds to a yield of 91%, based on the formaldehyde (133 g.) introduced into the polymerisation vessel. The intrinsic viscosity of the polymer is 1.08, measured in butyrolactone at 150° C.

*Example 13*

A mixture of 1 mol of urea, ⅓ mol of hydrazodicarbonamide, ⅓ mol of adipic acid dihydrazide and 6 mols of formaline in the form of a 30 percent aqueous solution are adjusted to a pH value of 8.2 with an aqueous suspension of barium hydroxide. After heating to 80° C. for one hour, the mixture is cooled and neutralized by the introduction of $CO_2$. Thereafter, the precipitated barium carbonate is filtered off and the solvent is evaporated at 40° C. in vacuo. The resinous condensation product is dissolved in an excess of butanol and the solution obtained is adjusted to a pH value of 2 with gaseous hydrochloric acid. After 24 hours' storage at room temperature, the mixture is neutralized with solid natrium bicarbonate, and, thereafter, filtered. Butanol is then distilled off in vacuo. There is obtained a viscous honey-like condensation product which is soluble in toluene. Polymerization is carried through according to Example 3 by adding 0.100 part by weight of the aforementioned condensation product to 1300 parts by volume of anhydrous toluene, and, thereafter introducing anhydrous gaseous formaldehyde into the polymerization vessel over a period of 2½ hours while stirring and cooling to —20° C. After working up according to Example 1, there are obtained 138 g. of purely white polyoxymethylene which correspond to a yield of 95 percent (calculated on the formaldehyde actually present in the polymerization vessel=145 g.). The intrinsic viscosity of the polymerizate is 0.95 (determined in a 0.5 percent solution in butyrolacton at 150° C.).

Instead of the aforementioned condensate of formaldehyde with urea, hydrazodicarbonamide and adipic acid dihydrazide there may be used mixed condensates of formaldehyde with at least 2 members of the group consisting of urea, thiourea, hydrazodicarbonamide and guanidine or other nitrogen containing compounds which are capable to form methylol derivatives, whereby about 1.6 to 3 mols of formaldehyde are applied per primary amino group. The condensates are preferably condensed to such a degree that they are soluble in organic solvents, such as butanol. However, it is also possible to use condensates which are not or only difficultly soluble in organic solvents. The molecular weight of the condensates may vary within wide limits and may amount to about 200 to 6000. Instead of the aforementioned methylol derivatives there may be used also the corresponding etherified products which are obtained by reaction with alcohols or mercaptans as pointed out above.

We claim:

1. A process for the production of a high molecular weight polyoxymethylene which comprises polymerizing substantially anhydrous formaldehyde in the presence of catalytic amounts of an organic nitrogen compound selected from the group consisting of urea, thiourea, carboxylic acid amides with up to 25 carbon atoms, carboxylic acid imides with up to 25 carbon atoms, caprolactam, urethane, melamine, dicyandiamide, guanidine, and hydrazodicarbonamides having up to 20 carbon atoms, the nitrogen atoms of the aforesaid organic nitrogen compound being substituted by a radical of one of the formulae —$CH_2OH$, —$CH_2$—S—R, and —$CH_2$—O—R, wherein R represents an alkyl group having 1–12 carbon atoms, said polymerization being carried out in an inert organic solvent at a temperature between —90° and +70° C., the catalytic amount of said catalyst being in the range of 0.000001 to 0.2 mol of catalyst per one thousand parts by volume of solvent.

2. The process of claim 1 wherein the catalyst is N,N'-dimethylol urea dimethyl ether.

3. The process of claim 1 wherein the catalyst is the N-methylol methyl ether of ethyl carbamate.

4. The process of claim 1 wherein the catalyst is N,N'-dimethylol thiourea diethyl ether.

5. The process of claim 1 wherein the catalyst is melamine hexamethylol methyl ester.

6. The process of claim 1 wherein the catalyst is N-methylol phthalimide.

7. The process of claim 1 wherein the catalyst is N-methylol succinimide.

8. The process of claim 1 wherein the catalyst is ε-caprolactam-N-methylol methyl ether.

9. The process of claim 1 wherein the catalyst is acetamide-N-methylol methyl ether.

10. The process of claim 1 wherein the catalyst is N,N'-dimethylol thiourea didodecyl thioether.

References Cited in the file of this patent
UNITED STATES PATENTS

| | | |
|---|---|---|
| 2,237,092 | Swain et al. | Apr. 1, 1941 |
| 2,844,561 | Bechtold et al. | July 22, 1958 |